Dec. 8, 1959  C. B. VOLDRICH ET AL  2,916,308
WELDED BRANCH CONNECTION WITH SHRUNK-ON REINFORCING SLEEVE
Filed July 5, 1955  2 Sheets-Sheet 1
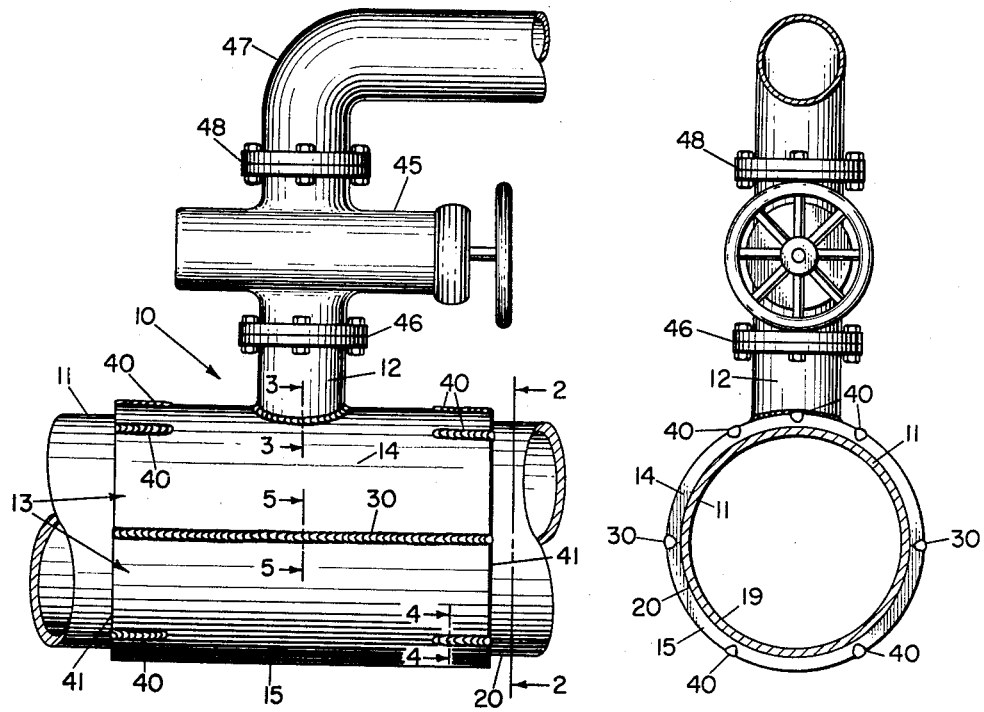
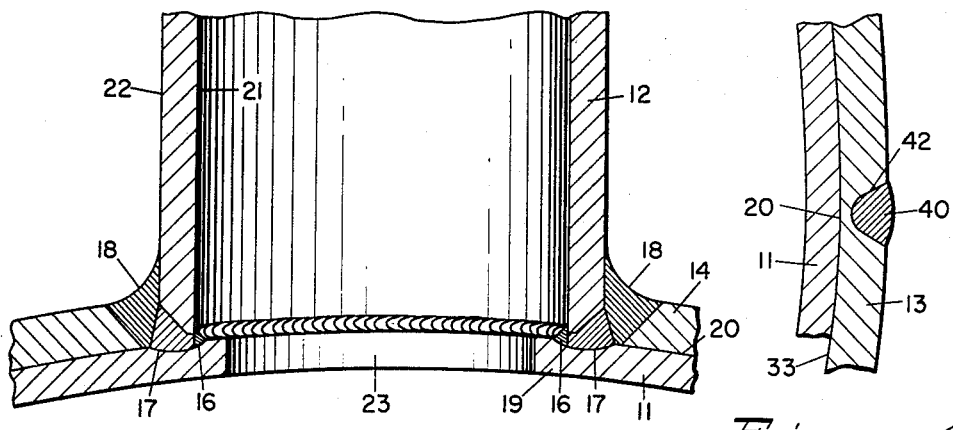
INVENTOR.
Constantine B. Voldrich
George M. McClure
BY
ATTORNEYS.

Dec. 8, 1959    C. B. VOLDRICH ET AL    2,916,308
WELDED BRANCH CONNECTION WITH SHRUNK-ON REINFORCING SLEEVE
Filed July 5, 1955    2 Sheets-Sheet 2
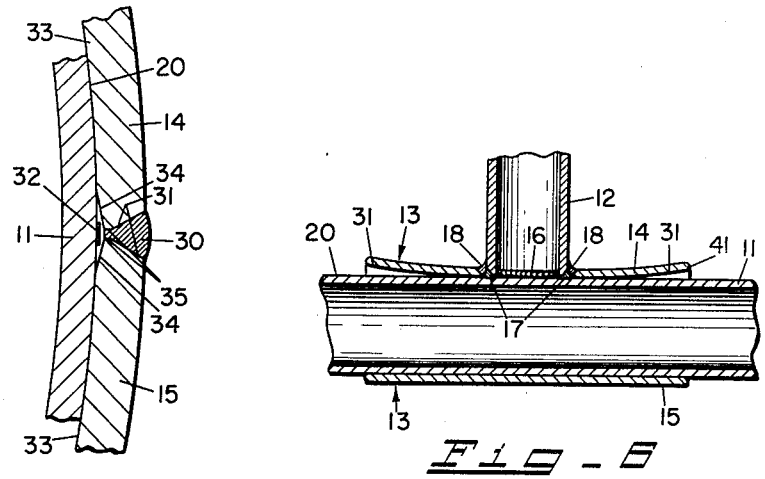
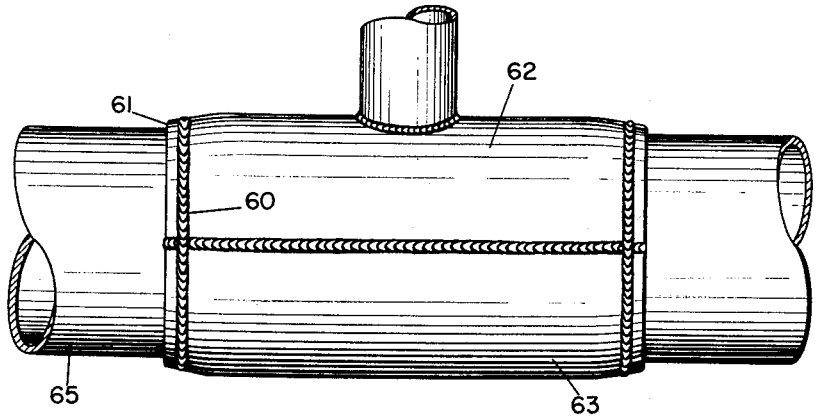
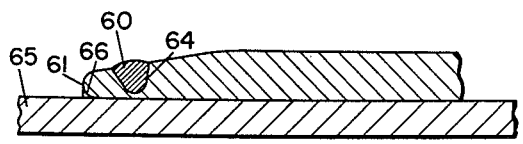
*INVENTOR.*
Constantine B. Voldrich
BY  George M. McClure
*ATTORNEYS.*

United States Patent Office 2,916,308
Patented Dec. 8, 1959

2,916,308

WELDED BRANCH CONNECTION WITH SHRUNK-ON REINFORCING SLEEVE

Constantine B. Voldrich and George M. McClure, Columbus, Ohio, assignors, by mesne assignments, to Texas Eastern Transmission Corporation, Shreveport, La., a corporation of Delaware Application July 5, 1955, Serial No. 519,744

3 Claims. (Cl. 285—45)

This invention relates to a branch connection on a cylindrical pressure vessel, and to a method of making such a connection. More particularly, this invention is concerned with making "hot tap" branch connections on pipelines containing moving fluids under pressure, such as natural gas.

The term "hot tap," as used herein and as understood in the pressure-piping and gas-transmission industry, means a connection made to a pipeline containing a fluid flowing under pressure without reducing the pressure to atmospheric pressure as an expedient to making the connection. In many instances in conventional practice, hot taps are made without reducing the pressure and without reducing the rate of flow.

Briefly, this invention comprises a welded branch connection to a cylindrical pressure vessel comprising: a cylindrical pressure vessel; a branch welded to the cylindrical pressure vessel; a plurality of sleeve members, encasing the vessel at and adjacent to the branch, which are welded one to the other at adjacent seams and one of which is provided with an aperture through which the branch is disposed; and one or more welds penetrating the wall of the sleeve members without penetrating the wall of the vessel and disposed adjacent the ends of the sleeves to shrink the sleeves into contact with the vessel at and near the ends.

This invention includes a method of making the branch connection described above.

With the advent in recent years of large, interstate, gas-transmitting pipelines has come the problem of development of techniques for making suitably rigid branch connections to pipelines without lowering the pressure and interrupting the flow of gas therein. Because of the many inherent advantages in the welding process, most pipelines being conventionally installed at the present time are of welded construction. The same advantages, such as reduction in pipe fabrication cost, reduction in the number of bolt and flange parts, and reduction in the cost of installation, make the method of welding ideally suited to making branch connections also.

In making welded branch connections on a cylindrical pressure vessel and especially in making welded "hot tap" branch connections on gas-transmission lines, certain problems must be coped with.

Obviously, the connection must be leakproof. In addition, when completed, it must be no weaker from an internal pressure-loading standpoint than the original pipe was prior to the connection; it must present a minimum of obstruction and impedance to the fluid flow; it must be installed with minimum danger to the workman making the connection; and it must be rigidly connected to the pipeline in such a manner that external forces against the branch pipe, such as produced by temperature expansion and contraction of the main pipe and branch or by earth settlement, will not be able to work or otherwise move the connection. Experience in examination of branch-connection failures has shown that external forces on the branch have been an important factor in the cause of failure.

Further in this respect, the connection must be made and reinforced without producing high stress concentrations in the wall of the pipeline.

It is an object of this invention to provide a branch connection and a method of making "hot tap" connections which is a solution to the problems stated above.

Specifically, it is an object of this invention to provide a pipeline branch connection, in which a minimum amount of welding is performed on the pipeline wall, with only slight penetration of weld therein. In this respect, it is an object to provide a connection in which the only welding penetration into the pipeline wall occurs at the peripheral contact between the branch and the pipeline, and all other fastening between the connection sleeve members and the pipeline is by means of contraction on the outer perimeter of the pipeline. Contraction is produced by means of shrinkage welds on the sleeve members of the connection.

It is an object of this invention to provide a connection for pipelines in which annular immobility of the connection is provided by shrink-fitting the ends thereof into contact with the pipeline to which the connection is made.

It is a further purpose of this invention to provide sleeve members adapted to encase a pipeline at and adjacent to the position of a branch connection in which a plurality of grooves has been provided at and near the ends thereof, the grooves serving to form a receptacle for a weld disposed therein, and further serving to guide and indicate the amount of weld to be deposited therein for optimum shrinkage of the sleeve members on the pipeline.

It is a further object of this invention to provide methods and apparatus for making "hot tap" connections to gas-transmission pipelines, in which the propensity to produce base metal welding cracks in the pipeline structure itself is substantially reduced to a negligible amount.

It is a still further purpose of this invention to provide a method and apparatus for producing a tight controlled shrinkage fit on the outer perimeter of a pipeline at a branch connection, in which the possibility of producing high stress concentrations in the pipeline at the ends of the connection by reason of shrinkage in welds penetrating the pipeline wall itself is substantially reduced to a negligible amount.

To these and other ends, this invention comprises apparatus and a method of applying the same, the preferred form of which is disclosed in the following description and attached drawings. Although the apparatus, structure, and method described and shown in detail, refer with particularity to a welded branch connection on a gas-transmission pipeline, it is apparent that this invention should not be limited thereto. Many of the significant details of this invention apply with equal qualification to any welded branch connection on a cylindrical pressure vessel. The invention may be used for other purposes, where its features are advantageous.

In the drawings:

Fig. 1 is an elevational view of a portion of the pipeline, having a welded branch connection of this invention connected thereto.

Fig. 2 is a partially sectioned elevational view, taken along the line 2—2 of Fig. 1;

Fig. 3 is an enlarged sectional view of the branch-connection weldment in this invention, taken along the line 3—3 of Fig. 1;

Fig. 4 is a sectional view of a portion of a weld, taken along the line 4—4 of Fig. 1;

Fig. 5 is a sectional view of a portion of a weld, taken along the line 5—5 of Fig. 1;

Fig. 6 is a schematic sectional elevational view of a branch connection for a pipeline;

Fig. 7 is an elevational view of a branch connection according to this invention in a different form; and Fig. 8 is a sectional view of a portion of a weld taken along the line 8—8 of Fig. 7.

Referring to Fig. 1, a branch connection, designated generally as 10, is shown in position on a portion of a pipeline, or header 11. The branch connection 10 comprises a branch pipe 12 and a plurality of cylindrical segments or sleeve members, designated generally 13. In the form of construction shown for an example, an upper sleeve 14 and a lower sleeve 15 are provided, each comprising one-half of a tubular section.

The pipeline 11 has an internal surface 19 and an external surface 20. The branch pipe 12 has an inner surface 21 and an outer surface 22.

The branch 12 is welded to the pipeline 11 by an internal peripheral weld 16, as shown in Fig. 3. In addition to the internal weld 16, the branch 12 is connected to the pipeline 11 by an external peripheral weld 17. The upper sleeve 14 is connected to the branch 12 by a peripheral weld 18.

An aperture 23 is provided in the pipeline 11 of a diameter sufficiently smaller than the internal diameter of the branch 12 so that the weld 16 is undisturbed. The upper sleeve 14 is connected to the lower sleeve 15 by a longitudinal weld 30, as shown in Figs. 1, 2, and 5. The weld 30, in its preferred form, is made between beveled edges 31 of sleeves 14 and 15, and is prevented from penetrating into the wall of the pipeline 11 by a layer of impervious material 32, such as glass tape applied to the outer surface 20 of the pipeline 11. The material 32 may be placed prior to the assembly of the upper and lower sleeve members 14 and 15, respectively. In order to prevent damage to the impervious material 32 during the placement of the sleeve members 13, the inner sleeve surfaces 33 are provided with a bevelled portion 34 adjacent to the longitudinal edge 35. In addition to preventing damage to the impervious material 32, the provision of the bevelled portion 34 allows the inner sleeve surfaces 33 of the sleeve members 13 to fit closely and substantially contiguous to the other surface 20 of the pipeline 11.

A plurality of shrinkage welds 40 is provided at spaced intervals around the outer periphery of the sleeves 13 at and adjacent to each end 41, as shown in Figs. 1, 2, and 4. Each shrinkage weld 40, in a preferred form, is disposed in a groove 42 extending from an end 41 longitudinally toward the center line of the branch connection. It has been found that the grooves are most advantageous when provided to a depth of three-quarters of the thickness of the sleeve members 13.

Referring to Fig. 1, a gate valve 45 is shown connected to branch 12 by a flange connection 46. An elbow 47 of a branch pipeline (not shown) may be fastened to the gate valve 45 by means of a flange connection 48.

In order to describe the installation of a branch connection 10 under most difficult conditions, the description following will concern itself with the method used and the features of the apparatus and construction under conditions when a branch connection 10 is installed, for example, on a 30-inch diameter pipeline 11 containing natural gas flowing at a gas velocity of 20 to 30 m.p.h., at a pressure of 940 p.s.i. It will be apparent that because of the high pressure and high rate of flow, such conditions of installation are of the most difficult and dangerous of connections to be made. Branch connections made to pipelines which contain air at atmospheric pressure present the least difficulties.

While the invention provides an advance in the art of making any branch connection, it is particularly advantageous under the most difficult conditions set forth in the example.

In making a "hot tap" branch connection to a gas pipeline, as a first step, the branch pipe 12 is placed on the pipeline 11 and welded thereto by the internal weld 16 and the external weld 17. Of course, the branch pipe 12 has been previously cut to a "saddle" shape at the connection end, so that the branch pipe 12 substantially fits the outer contour of the pipeline 11. At the time that the branch pipe 12 is welded to the pipeline 11, the aperture 23 has not been made and the pipeline 11 wall is unbroken.

One particular problem which is minimized in the provision of a branch connection according to the invention, is the ever-present danger of weld penetration being so deep during the molten weld stage that a burn-through occurs at the place of welding. The welds 16 and 17 may be comparatively small with respect to the size required to carry the full load pressure to which the branch connection 10 is to be subjected. The reinforcement sleeve 14 and weld 18, which are later applied, provide additional strength at the position of branch connection. The primary purpose of the welds 16 and 17 is to provide a fluid-tight seal between the branch 12 and the pipeline 11. Thus, penetration into the pipeline 11 may be a minimum, reducing the amount of heat conducted into the pipeline during the operation and the danger of producing a burn-through at the place of welding.

After the branch pipe 12 has been welded in place at welds 16 and 17, the sleeve members 13 are placed in position encircling the pipeline 11, and clamped as tightly as possible to the outer surface 20 of the pipeline 11.

Longitudinal welds 30 between the cylindrical segments 13 are made by a series of multiple passes that are made along the weld length to build a substantial fillet between the bevelled edges 31 and the longitudinal edges 35. The previously placed impervious material 32 effectively prevents any weld penetration into the pipeline 11 wall. In this manner, heat conducted from the welding operation into the pipeline 11 wall is held to a minimum so that under normal conditions the possibility of weakening the pipeline at the point of weld is reduced to a negligible factor. As the welds 30 are progressively made by overlapping welded passes, the cooling of the weld beneath the pass being applied produces a contraction of the welded joint and the sleeve members are shrunk into a tighter peripheral contiguous relationship of encasement on the pipeline 11.

At this stage of the process of making a branch connection 10, the ends 41 of the sleeves 13 are usually found to be raised from the outer surface 20 of the pipeline 11, as shown exaggerated schematically in Fig. 6. The clearance between the inner surfaces of the sleeves 31 and the outer pipeline surface 20 at the ends 41 is usually the greatest in a plane radial to the longitudinal axis of the pipeline, and passing through the longitudinal axis of the branch 12. It has been found that the reason that the clearance is the greatest in this radial plane of the branch connection is because the peripheral weld 18 at the meeting between the branch 12 and the sleeve member 14 is at its closest proximity to the ends 41 in this plane. Distortion is caused by shrinkage in the weld 18. On the opposite side of the connection the lower sleeve member 15 will usually be found to have the least clearance at the end 41 and this may be attributed to the shrinkage effect produced by the weld 18 on the opposite side of the connection.

As the next step in the process of making the branch connection 10, the welds 40 are made at and near the ends 41 of the sleeves 13. The welds 40 are placed by means of making progressive passes depositing successive layers of weld metal. The purpose of the welds 40 is to effect a contraction of the inner peripheral diameter of the sleeves 13 to a contiguous position on the pipeline 11. The position of maximum required shrinkage to accomplish this result is at the point of maximum clearance at the end of the sleeve 13 on the side of the pipeline 11 where the branch 12 is connected. It has been found that the optimum positioning of the welds 40 is at equally spaced angles around the periphery of the sleeves 13, with an additional weld 40 at the position (shown in Fig. 6) of maximum clearance.

While it is possible to produce contraction of the periphery of the sleeve 13 by means of placing bead welds on the outer surface of the sleeves 13, in the preferred form of the invention the welds 40 are disposed in previously provided grooves 42.

One function of the grooves is to allow the placement of welds as near as possible to the center of the thickness of the sleeve member 13. This provides a minimum tendency for the sleeve members 13 to warp away from the surface of the pipeline. This warpage would be most pronounced if bead welds were placed only on the outer surface of the sleeve. Another function of the grooves is to provide, as a control, an indication, to the welder making the branch connection, of the proper amount of weld required to produce optimum shrinkage conditions and a proper contiguous fit on the outside of the pipeline 11. Through the use of the groove 42 the operator may be instructed to fill the groove flush with the surface of the sleeves 13, or slightly crowned, and thereby the amount of weld and contraction may be controlled.

Control of the amount of shrinkage is important because too much contraction will cause excessive reduction in the diameter of the pipeline itself, by reason of the annular pressure produced by the ends 41 of the sleeves 13. Such excessive reduction in the internal diameter of the pipeline 11 will result in an annular ring of unnecessarily high stress concentration directly beneath the ends 41 of the sleeves 13. Such an annular ring of unnecessarily high stress concentrations and excessively reduced diameter are undesirable, in that they provide a potential source of cracks in the pipeline. A controlled amount of welding permits a controlled amount of shrinkage and annular pressure.

On the other hand, control of the amount of weld is important, in that, if too little weld is provided, the sleeves 13 will not be drawn into contiguous contact with the outer surface 20 of the pipeline 11, and a condition similar to that shown in Fig. 6 will remain. When an elbow 47 is fastened above the branch connection 10 in such a position to provide an external force in the longitudinal direction of the pipeline by reason of expansion and contraction in the branch pipeline connected thereto, the branch 12 will be subjected to successive contramoments, tending to progressively loosen the branch connection 10 and produce failure of the welds 16, 17, and 18. In those situations in which the ends 41 are not brought into contact with the pipeline 11, the effect of these moments is greatly increased.

After the welds 40 have been disposed on the sleeves 13, a conventional tapping machine (not shown) is fastened on the flange connection 48 and the aperture 23 is made in the pipeline 11. When, in the usual practice, the aperture 23 has been made and the tap has been withdrawn, the gate valve 45 is closed and the tapping machine is removed. After the tapping machine has been removed, the elbow 47 may be connected to the flange 48.

Referring to Figs. 7 and 8, in some circumstances it may be advantageous to provide a circumferential weld 60 adjacent to the ends 61 of suitable sleeve members 62 and 63. As in the previous form of the invention, the weld 60 is preferably placed in a groove 64 of a depth less than the thickness of the sleeve 62 so that the weld 60 will be controlled during its placement. Thus penetration into the wall of the pipeline 65 will be prevented and a measured amount of contraction will be provided as determined by the amount of weld that may be placed in the groove 64.

The end 61 is preferably provided with a rounded inner edge 66. This rounded edge 66 decreases the stress-concentration effect in the pipeline 65 wall when the end 61 is shrunk into contact with the pipeline 65 wall.

In the past, because of the necessity of anchoring the ends 41 of the sleeve members 13 against any play or movement with respect to the pipeline, it has been the conventional practice to circumferentially provide a fillet weld between the ends 41 and the pipeline 11 wall. These welds penetrated the wall of the pipeline and, of course, were subjected to the rapid conductive cooling effect of the moving fluid in the pipelines. It is significant that in welding on any pipeline containing a flowing fluid, the fluid has been found to conduct heat away from the point of welding at a rapid rate. This rapid cooling has been found to produce cracks in the pipeline 11 wall, which, in conventional terminology are known as "base metal cracks," and which have been sources of potential pipeline failure. Further, the provision of a fillet weld at the end of the sleeve members causes a "stress raiser" (position of high stress concentration). Experience has shown these stress concentrations to be possible sources of failure.

It will be understood, of course, that, while the forms of the invention herein shown and described constitute the preferred embodiments of the invention, it is not intended herein to illustrate all of the possible equivalent forms or ramifications of the invention. It will also be understood that the words used are words of description, rather than of limitation, and that various changes, such as changes in shape, relative size, and arrangement of parts may be substituted without departing from the spirit or scope of the invention herein disclosed.

What is claimed is:

1. A welded branch connection comprising a pipe having an aperture therein; a branch welded to said pipe in communication with said aperture with the weld extending entirely therearound; a plurality of sleeve-forming members encasing said pipe at and adjacent to said branch, assembled one to the other by welded connections to form a sleeve; at least one of said sleeve-forming members having an aperture surrounding said branch and welded thereto adjacent the first mentioned weld and forming the only welded connection between said pipe and sleeve-forming members, the sleeve being shrunk into contact with said pipe at the sleeve ends only, and at least one weld in addition to said welded connections of said sleeve-forming members, disposed adjacent to each end of said sleeve, entering the outer wall of said sleeve without penetrating through said sleeve and without weld contact with said pipe.

2. A welded branch connection according to claim 1 wherein said at least one weld in addition to said welded connections of said sleeve-forming members are disposed in grooves adjacent to each end of said sleeve-forming members.

3. A welded branch connection according to claim 1 wherein said at least one weld in addition to said welded connections of said sleeve-forming members is disposed in grooves, having a depth of about three-quarters of the thickness of said sleeve-forming members and located adjacent to each end of said sleeve-forming members.

References Cited in the file of this patent

UNITED STATES PATENTS

| | | |
|---|---|---|
| 1,220,770 | Murray | Mar. 27, 1917 |
| 1,268,980 | Krumholz | June 11, 1918 |
| 1,457,183 | Mitchell | May 29, 1923 |
| 1,870,771 | De Witt | Aug. 9, 1932 |
| 2,128,111 | Woods | Aug. 23, 1938 |
| 2,219,085 | Watson | Oct. 22, 1940 |
| 2,344,424 | Singleton | Mar. 14, 1944 |
| 2,362,505 | Smith | Nov. 14, 1944 |

FOREIGN PATENTS

| | | |
|---|---|---|
| 593,914 | Germany | Mar. 6, 1934 |
| 16,943 | Australia | Oct. 10, 1934 |